United States Patent Office 3,583,858
Patented June 8, 1971

3,583,858
STRENGTHENING GLASS-CERAMIC ARTICLES
Roger F. Bartholomew, Corning, N.Y., assignor to Corning Glass Works, Corning, N.Y.
No Drawing. Filed Apr. 10, 1968, Ser. No. 720,403
Int. Cl. C03c 21/00
U.S. Cl. 65—30                                    2 Claims

ABSTRACT OF THE DISCLOSURE

This invention relates to a means for preventing etching and staining of glass-ceramic articles which are being strengthened through an ion exchange reaction wherein a high temperature molten bath of a lithium salt provides the source of exchanging ions. This invention contemplates adding about 0.5–10% by weight of an alkali metal pyrosulphate selected from the group consisting of $Na_2S_2O_7$ and $K_2S_2O_7$ to a bath containing molten $Li_2SO_4$ operating at temperatures above about 800° C.

---

A recent advance in the field of glass-ceramic technology has been the discovery that such articles can be strengthened as much as severalfold through an ion exchange reaction confined to a surface layer thereof. A glass-ceramic article is produced through the carefully controlled heat treatment of a glass body. Hence, a glass-forming batch of a desired composition, to which a nucleating agent is usually added, is melted and this melt cooled to a glass and an article of a particular configuration shaped therefrom. Subsequently, the glass shape is subjected to a specific heat treating schedule such that nuclei are first developed in the glass which provide sites for the growth of crystals thereon as the heat treatment is continued. The final product consists of relatively uniformly-sized, fine-grained crystals homogeneously dispersed in a glassy matrix, the crystal phase constituting the predominant part of the article. Glass-ceramic bodies are more than 50% by weight crystalline and, frequently, are more than 75% by weight crystalline. Because of this very high crystallinity, glass-ceramic articles commonly exhibit chemical and physical properties quite different from those of the parent glass and which are more nearly characteristic of a crystalline article. Furthermore, the very high crystallinity of glass-ceramic articles results in a residual glassy matrix having a composition much different from that of the parent glass inasmuch as the constituents comprising the crystals will have been precipitated therefrom. Hence, in glass-ceramic articles derived from silicate glasses, the residual glassy matrix will normally have a very high silica content.

For a more complete discussion of the manufacture and structure of glass-ceramic articles, reference is hereby made to U.S. Pat. No. 2,920,971. The crystal phases that can be developed in glass-ceramic articles are essentially limitless and reflect the base glass compositions and the heat treating schedules utilized. My invention is particularly applicable with glass-ceramic articles wherein the principal crystal phase therein is stuffed beta-quartz.

The origin of the concept of stuffed beta-quartz was early expressed by Buerger, The Stuffed Derivatives of the Silica Structures, Am. Mineral., 39, 600–14 (1954), further discussed by Schreyer and Schairer, Metastable Solid Solutions with Quartz-Type Structures on the Join $SiO_2$-$MgAl_2O_4$, Geophys. Lab. Paper No. 1357 (1961), and re-examined by Beall, Karstetter, and Rittler, Crystallization and Chemical Strengthening of Stuffed Beta-Quartz Glass-Ceramics, J. Am. Cer. Soc., 50, No. 4, 181–190, April 1967. The last literature reference discusses in depth the various hypotheses which have been proposed as mechanisms for the production of stuffed beta-quartz and discloses that lithium, magnesium, and zinc are the most common stuffing ions.

In general, the strengthening of glass-ceramic articles through an ion-exchange reaction comprises contacting such articles having crystals containing exchangeable cations, normally alkali metal ions but also magnesium and aluminum ions, with an external source of cations which will replace the exchangeable cations in the crystals in a surface layer of the article. This exchange of cations causes the development of an integral surface compression layer in the article.

Pending U.S. patent applications Ser. No. 365,161, filed May 5, 1964, and Ser. No. 636,602, filed May 8, 1967, disclose two types of ion-exchange reactions which lead to the strengthening of glass-ceramic articles wherein beta-quartz stuffed with magnesium and/or lithium ions comprises the principal crystal phase. In the former application, the glass-ceramic article was contacted with a source of lithium ions, commonly a bath of a molten lithium salt, at temperatures between about 800°–850° C. for a period of time of sufficient length to cause two lithium ions to replace one magnesium ion within the crystal structure in a surface layer of the article. The latter application involves treating similar glass-ceramic articles with a source of lithium ions at a temperature of at least 900° C., but not more than 1175° C., to cause the replacement of aluminum ions by lithium ions in the stuffed beta-quartz structure of a surface layer in the article.

In carrying out these exchange reactions, a bath of molten $Li_2SO_4$ was employed as the source of lithium ions. Since $Li_2SO_4$ has a melting point of about 860° C., a mixture of 90% $Li_2SO_4$ and 10% $K_2SO_4$ by weight was utilized in those reactions involving temperatures between about 800°–850° C. Thermodynamic calculations indicate that the reaction between $SO_4^{-2}$ and $SiO_2$ has a negative free energy change above 700° C. Thus, the reaction between $Li_2SO_4$ and $SiO_2$ can be written:

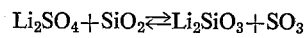

$$Li_2SO_4 + SiO_2 \rightleftharpoons Li_2SiO_3 + SO_3$$

Therefore, any glass-ceramic article containing a $SiO_2$-rich glassy phase can react with the sulphate according to the above reaction and, thereby, $SiO_2$ will be removed from the article. This reaction, then, leads to the surface attack of the glass-ceramic article and will give rise to etching and/or staining of the article when contacted with fused $Li_2SO_4$ at temperatures above 700° C. However, this reaction can be reversed through the addition of $S_2O_7^{-2}$ to the fused $Li_2SO_4$. The pyrosulphate thermally decomposes at these temperatures to yield $SO_3$ and $SO_4^{-2}$. Hence, I believe that the addition of $S_2O_7^{-2}$ reverses the reaction between $Li_2SO_4$ and $SiO_2$ by acting as a source of $SO_3$ in the bath.

I have discovered that this etching and/or staining of glass-ceramic articles having a residual silica-rich glassy matrix can be substantially eliminated through the addition of about 0.5–10% of $Na_2S_2O_7$ and/or $K_2S_2O_7$ to the bath containing molten $Li_2SO_4$. Thus, the fusion of a mixture of $Li_2SO_4$ with the pyrosulphate followed by appropriate additions of pyrosulphate at necessary interval will maintain the molten bath such that etching will not be a problem. Further, the inclusion of pyrosulphate permits the use of stainless steel containers for the high temperature baths which commonly give rise to considerable staining when $Li_2SO_4$ is employed at high temperatures.

Although I believe the mechanism leading to the elimination of the etching and/or staining depends upon the decomposition of the pyrosulphate to yield $SO_3$, this cannot be the complete explanation since bubbling $SO_3$ itself through the bath of molten salt does not appear to be nearly as effective as the use of pyrosulphate. Also, of course, from a manufacturing point of view, the addition of pyrosulphate is more practical than bubbling $SO_3$ through the bath.

$Li_2S_2O_7$ should perform similarly to $Na_2S_2O_7$ and $K_2S_2O_7$ but it is so thermally unstable as to be of little practical use.

Table I records two glass-ceramic compositions, in weight percent on the oxide basis, which were strengthened in accordance with the disclosures of the two above-mentioned pending applications, the lower temperature ion-exchange reactions (800°–850° C.) contemplating the exchange of two lithium ions for one magnesium ion while the higher temperature ion exchange reactions (>900° C.) reflect the exchange of three lithium ions for one aluminum ion. The low temperature exchanges utilized baths of 90% $Li_2SO_4$ and 10% $K_2SO_4$ whereas the high temperature exchanges employed $Li_2SO_4$ alone.

In both of these compositions, the principal crystal phase, as identified through X-ray diffraction analysis, was stuffed beta-quartz. Electron microscope examination of the articles indicated crystallinity in excess of about 70% by weight. The residual glassy matrix was high in silica content.

TABLE I

|  | Percent | |
| --- | --- | --- |
|  | 1 | 2 |
| $SiO_2$ | 63.9 | 60.2 |
| $Al_2O_3$ | 25.4 | 27.4 |
| MgO | 3.8 | 1.8 |
| $Li_2O$ | 1.9 | 2.1 |
| $ZrO_2$ | 4.7 | 5.7 |
| $Na_2O$ | 0.2 |  |
| $K_2O$ | 0.1 |  |
| $P_2O_5$ |  | 2.8 |

Table II reports the ion exchange treatment applied to these glass-ceramic articles and a visual description of each article after the treatment. Modulus of rupture measurements, conducted in the conventional manner upon ¼″ diameter cane samples, clearly demonstrated the deleterious effect the etching and staining have upon the strength of the article. Hence, in the cane samples subjected to the high temperature ion exchange, where etching and staining were essentially absent, the cane exhibited modulus of rupture values of 60,000 p.s.i. and higher whereas the severely etched and stained cane exhibited modulus of rupture values of about 40,000 p.s.i. Likewise, in the cane samples treated to the lower temperature ion exchange, where etching and staining were essentially absent, the cane exhibited modulus of rupture values of 100,000 p.s.i. where as the etched and stained cane samples were determined to be about 60,000 p.s.i. Thus, not only is the etching and staining undesirable from an appearance point of view, but are practically undesirable since the mechanical strength of the articles is adversely affected thereby. Modulus of rupture determinations carried out on unstrengthened cane samples of these compositions averaged about 10,000–15,000 p.s.i.

In each experiment, the glass cane were preheated in air to a temperature near the operating temperature of the bath and then plunged into the bath held in a stainless steel container. After the specified immersion time, the cane were removed from the bath, allowed to cool in air and the adhering salt washed away with water.

TABLE II

| Ex. No. | Ion exchange treatment | Description of article |
| --- | --- | --- |
| 1 | $Li_2SO_4$ at 950° C. for 24 hrs | Severe etching and staining. |
| 1 | $Li_2SO_4$ plus 1% $K_2S_2O_7$ at 950° C. for 24 hrs. | Slight etching and no staining. |
| 1 | $Li_2SO_4$ plus 5% $K_2S_2O_7$ at 950° C. for 24 hrs. | No etching or staining. |
| 1 | $Li_2SO_4$ plus 1% $Na_2S_2O_7$ at 950° C. for 24 hrs. | Slight etching and no staining. |
| 1 | $Li_2SO_4$ plus 5% $Na_2S_2O_7$ at 950° C. for 24 hrs. | No etching or staining. |
| 2 | 90% $Li_2SO_4$–10% $K_2SO_4$ at 850° C. for 4 hrs. | Slight etching and staining. |
| 2 | 90% $Li_2SO_4$–10% $K_2SO_4$ plus 0.5% $Na_2S_2O_7$ for 4 hrs. | Very slight etching and no staining. |
| 2 | 90% $Li_2SO_4$–10% $K_2SO_4$ plus 2.0% $Na_2S_2O_7$ for 4 hrs. | No etching or staining. |
| 2 | $Li_2SO_4$ at 1,050° C. for 24 hrs | Very severe etching and staining. |
| 2 | $Li_2SO_4$ plus 2% $K_2S_2O_7$ at 1,050° C. for 24 hrs. | Slight etching and staining. |
| 2 | $Li_2SO_4$ plus 5% $K_2S_2O_7$ at 1,050° C. for 24 hrs. | Very slight etching and no staining. |
| 2 | $Li_2SO_4$ plus 10% $K_2S_2O_7$ at 1,050 °C. for 24 hrs. | No etching or staining. |

This table is believed to amply illustrate the significant effect which the addition of even a very small amount of pyrosulphate to the bath of molten $Li_2SO_4$ salt has upon reducing etching and staining. Amounts of pyrosulphate greater than 10% by weight may be utilized but are unnecessary and can lead to an excessive production of $SO_3$. About 1–5% additions are usually sufficient.

I claim:

1. In a method of strengthening a glass-ceramic article, wherein the crystal phase thereof consists essentially of beta-quartz stuffed with lithium and/or magnesium ions, through an ion exchange reaction carried out at temperatures between about 800°–1175° C. in a bath containing molten $Li_2SO_4$, the improvement which comprises adding about 0.5–10% by weight total of at least one alkali metal pyrosulphate selected from the group consisting of $Na_2S_2O_7$ and $K_2S_2O_7$ to said bath to minimize etching and staining of said glass-ceramic article caused by an action of said bath on the article.

2. A method according to claim 1 wherein $K_2S_2O_7$ is added in an amount of about 1–5% by weight to said bath.

References Cited

UNITED STATES PATENTS

| 2,075,446 | 3/1937 | Leibig | 65—30X |
| 2,198,733 | 4/1940 | Leibig et al. | 65—30X |
| 2,732,298 | 1/1956 | Stookey | 65—30X |
| 3,395,999 | 8/1968 | Lewek | 65—30 |
| 3,424,567 | 1/1969 | Smith | 65—30 |

OTHER REFERENCES

Beall et al., "Crystallization and Chemical Strengthening of Stuffed B-Quartz Glass-Ceramics," Journ. of the Am. Cer. Soc., vol. 50, No. 4, 1967, pp. 181–190.

S. LEON BASHORE, Primary Examiner

J. H. HARMAN, Assistant Examiner

U.S. Cl. X.R.

65—33; 106—39